(12) United States Patent
Arai et al.

(10) Patent No.: US 12,362,547 B2
(45) Date of Patent: Jul. 15, 2025

(54) WIRE HARNESS

(71) Applicant: YAZAKI CORPORATION, Tokyo (JP)

(72) Inventors: Kenzo Arai, Nasukarasuyama (JP); Atsushi Suzuki, Nasukarasuyama (JP)

(73) Assignee: YAZAKI CORPORATION, Tokyo (JP)

( * ) Notice: Subject to any disclaimer, the term of this patent is extended or adjusted under 35 U.S.C. 154(b) by 203 days.

(21) Appl. No.: 18/471,261

(22) Filed: Sep. 20, 2023

(65) Prior Publication Data

US 2024/0097418 A1 Mar. 21, 2024

(30) Foreign Application Priority Data

Sep. 21, 2022 (JP) ................. 2022-149807

(51) Int. Cl.
*H02G 3/16* (2006.01)
*B60R 16/02* (2006.01)
*B60R 16/023* (2006.01)
*H01R 13/639* (2006.01)

(52) U.S. Cl.
CPC .......... *H02G 3/16* (2013.01); *B60R 16/0215* (2013.01); *B60R 16/0239* (2013.01); *H01R 13/639* (2013.01)

(58) Field of Classification Search
CPC ............ H02G 3/08; H02G 3/081; H02G 3/16; H02G 3/10; H02G 3/14; H02G 3/088; H02G 3/086; H05K 5/00; H05K 5/02; H05K 7/06; H05K 7/00; B60R 16/00; B60R 16/02; B60R 16/0238; B60R 16/0239; B60R 16/0207; H01R 13/684; H01R 13/46

USPC ............. 174/50, 520, 542, 535, 59, 559; 220/3.2–3.9, 4.02; 439/76.1, 76.2, 949; 312/223.1, 223.6; 361/600, 601, 622, 641
See application file for complete search history.

(56) References Cited

U.S. PATENT DOCUMENTS

| 7,122,738 | B2 * | 10/2006 | Kanamaru | H01R 13/518 361/600 |
| 8,969,723 | B2 * | 3/2015 | Hirasawa | H02G 3/088 174/50 |
| 9,172,218 | B2 * | 10/2015 | Kamigaichi | H02G 3/081 |
| 9,203,221 | B2 * | 12/2015 | Kamigaichi | H02G 3/08 |
| 10,759,358 | B2 * | 9/2020 | Nakano | B60R 16/0207 |
| 11,394,187 | B2 * | 7/2022 | Tashiro | B60R 16/0239 |

FOREIGN PATENT DOCUMENTS

| JP | H07-39044 A | 2/1995 |
| JP | 2022-7370 A | 1/2022 |

\* cited by examiner

*Primary Examiner* — Angel R Estrada
(74) *Attorney, Agent, or Firm* — KENEALY VAIDYA LLP

(57) ABSTRACT

In a wire harness, a frame includes a partition wall. The partition wall includes a locking part that locks a joint connector housed in a sectioned space part from an opening part on the lower side. When an electronic component block is being fixed to a frame by a fixing part, the locking part is positioned on the lower side than the electronic component block is and isolated from the electronic component block in the orthogonal direction that is orthogonal to the insertion direction (first height direction) of the electronic component block when the frame is viewed from the opening part on the lower side.

4 Claims, 5 Drawing Sheets

WIRE HARNESS

CROSS-REFERENCE TO RELATED APPLICATION(S)

The present application claims priority to and incorporates by reference the entire contents of Japanese Patent Application No. 2022-149807 filed in Japan on Sep. 21, 2022.

BACKGROUND OF THE INVENTION

1. Field of the Invention

The present invention relates to a wire harness.

2. Description of the Related Art

In an electrical junction box, electronic components (circuit protection components such as fuses and fusible links, relays, and the like) are housed in a casing, and the electronic components are electrically connected to other electronic components and wires via relay busbars in the casing. Such an electrical junction box, as disclosed in Japanese Patent Application Laid-open No. 2022-007370 and Japanese Patent Application Laid-open H7-039044, for example, houses joint connectors inside the cover of the electrical junction box to prevent water and other foreign matters from entering the joint connectors.

By the way, when housing and fixing joint connectors in an electrical junction box, it is necessary to set the fixing position by considering interference and the like with wire bundles, electronic components, and relay blocks that are housed together with the joint connectors.

SUMMARY OF THE INVENTION

The present invention is designed in view of the foregoing circumstance, and an object thereof is to provide a wire harness capable of securely housing and fixing a joint connector in an electrical junction box.

In order to achieve the above mentioned object, a wire harness according to one aspect of the present invention includes a wire exhibiting conductivity; and an electrical junction box connected to the wire, wherein the electrical junction box includes: a frame including a housing space part that houses an electronic component inside, the frame being formed in a tubular shape with opening parts positioned on an upper side and on a lower side when installed; an upper cover that closes the opening part of the frame on the upper side; and a lower cover that closes the opening part of the frame on the lower side, the frame includes: at least one partition wall that sections the housing space part for each electronic component block into which the electronic component is assembled; and a fixing part that fixes the electronic component block housed from the opening part on the lower side to each sectioned space part sectioned by the partition wall, the partition wall includes a locking part that locks a joint connector that is housed in the sectioned space part from the opening part on the lower side, the joint connector electrically connecting a plurality of the wires, and the locking part is positioned on the lower side than the electronic component block is when the electronic component block is being fixed to the frame by the fixing part, and isolated from the electronic component block in an orthogonal direction that is orthogonal to an insertion direction of the electronic component block when the frame is viewed from the opening part on the lower side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the accompanying drawings. Note, however, that the present invention is not limited by the embodiment described hereinafter. Furthermore, structural components in the following embodiment include those that can be easily replaced by those skilled in the art, or those that are substantially the same. Furthermore, as for the structural components in the following embodiment, various omissions, substitutions, and changes can be made without departing from the scope of the present invention.

EMBODIMENT

Figure 1:
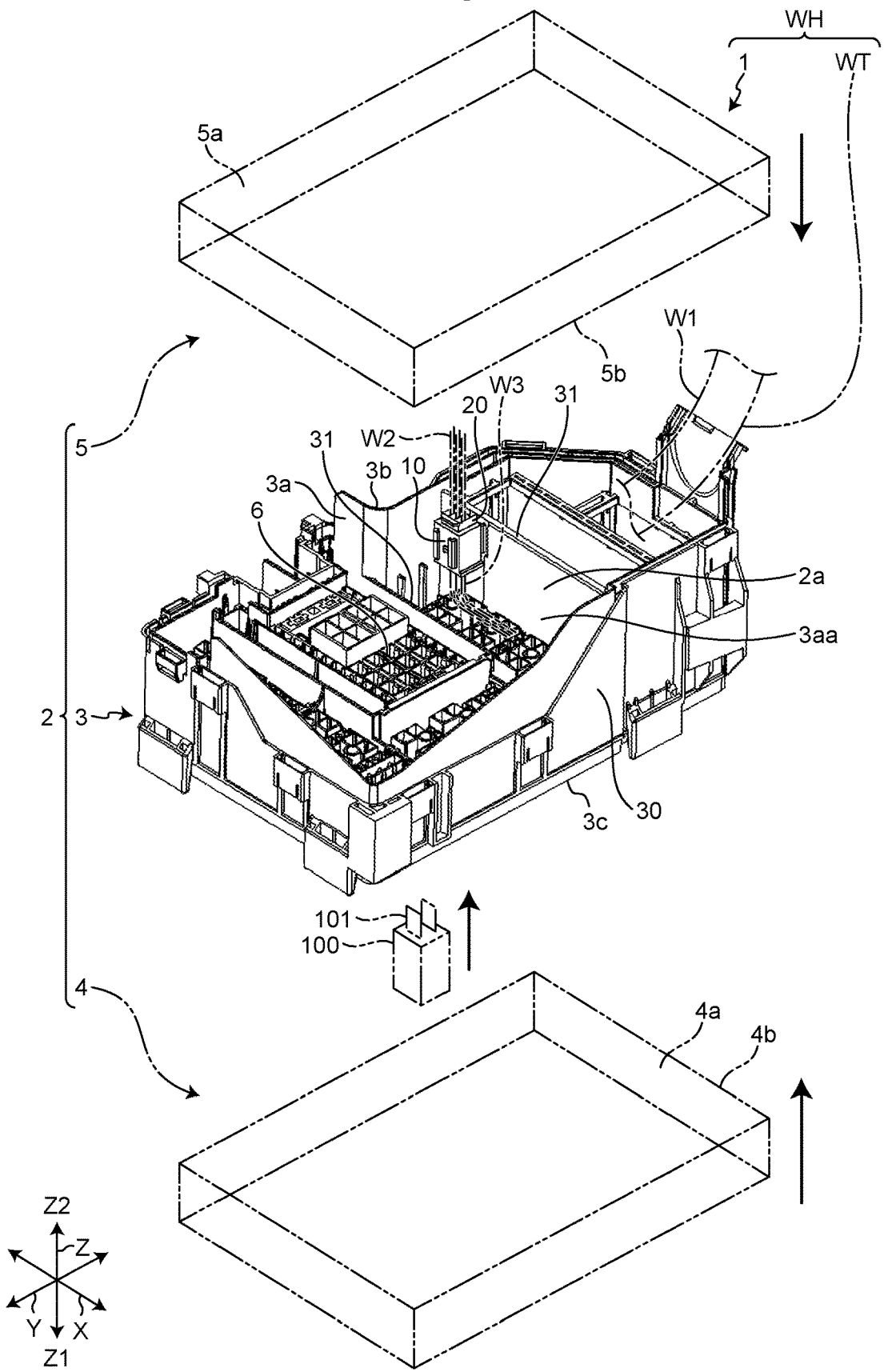
FIG. 1 is an exploded perspective view schematically illustrating an overview of a configuration of a wire harness according to an embodiment.
Figure 2:
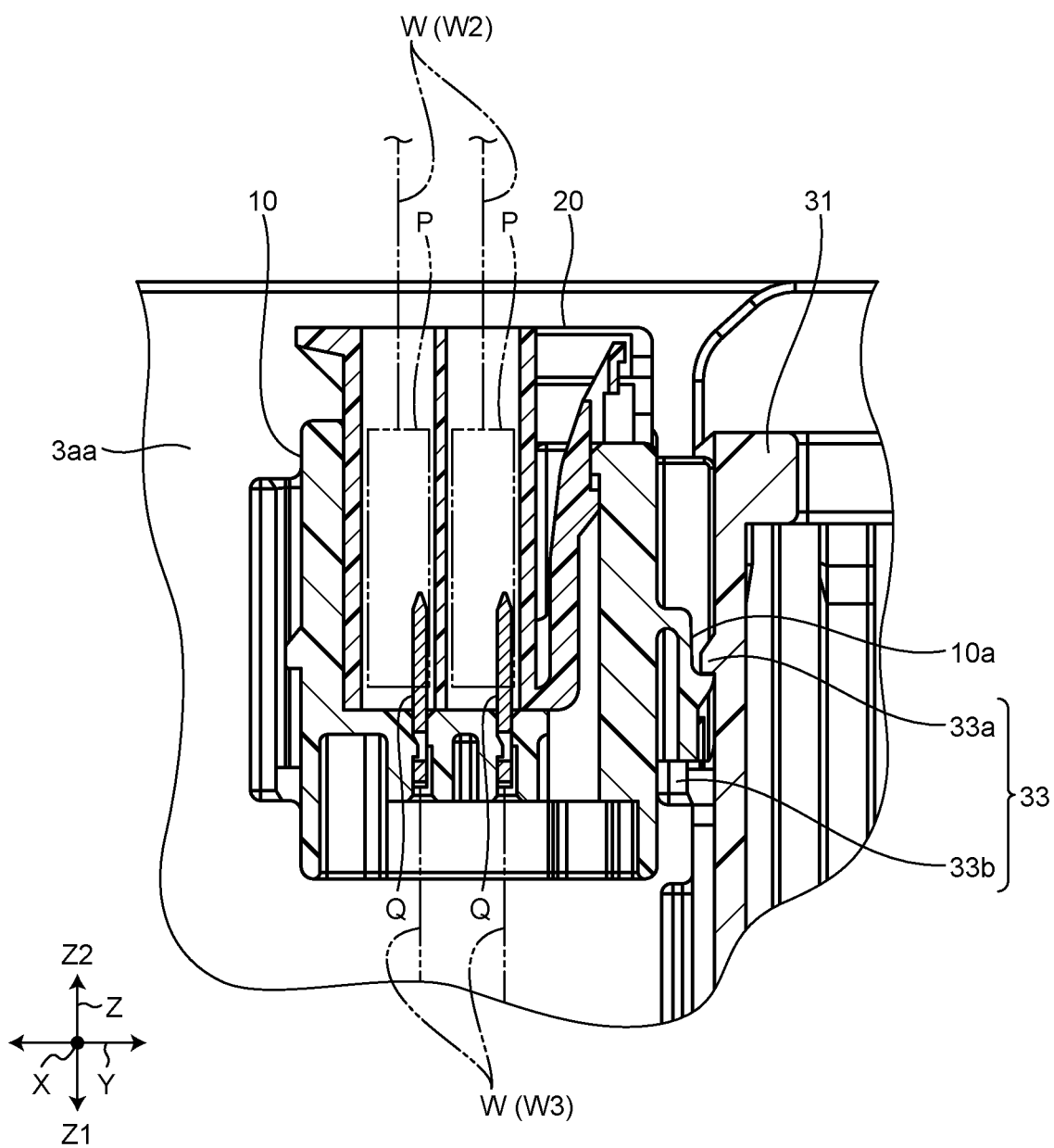
FIG. 2 is a sectional view schematically illustrating a locking structure of a joint connector inside an electrical junction box of FIG. 1.
Figure 3:
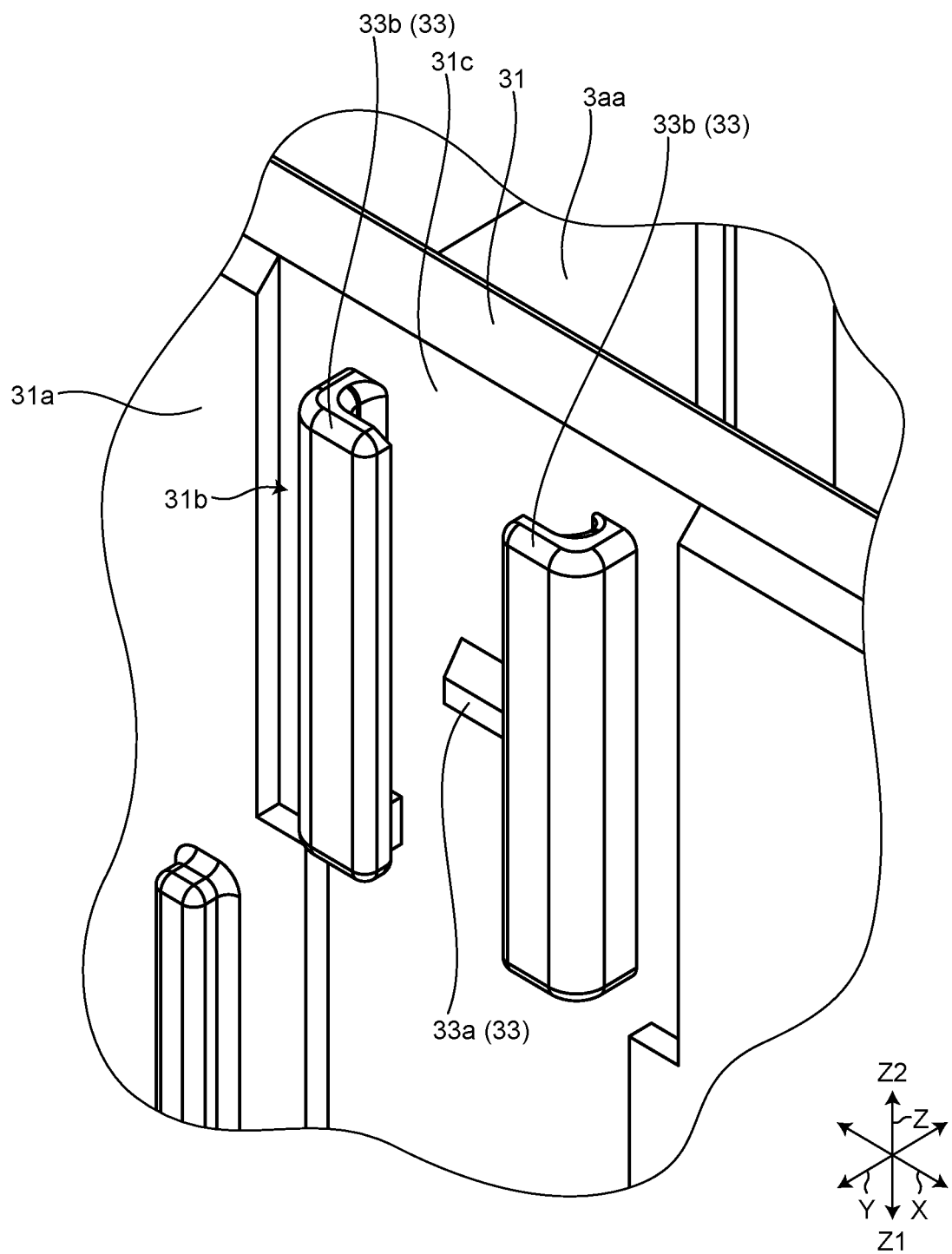
FIG. 3 is a perspective view schematically illustrating a locking part of the joint connector provided on a partition wall of the electrical junction box.
Figure 4:
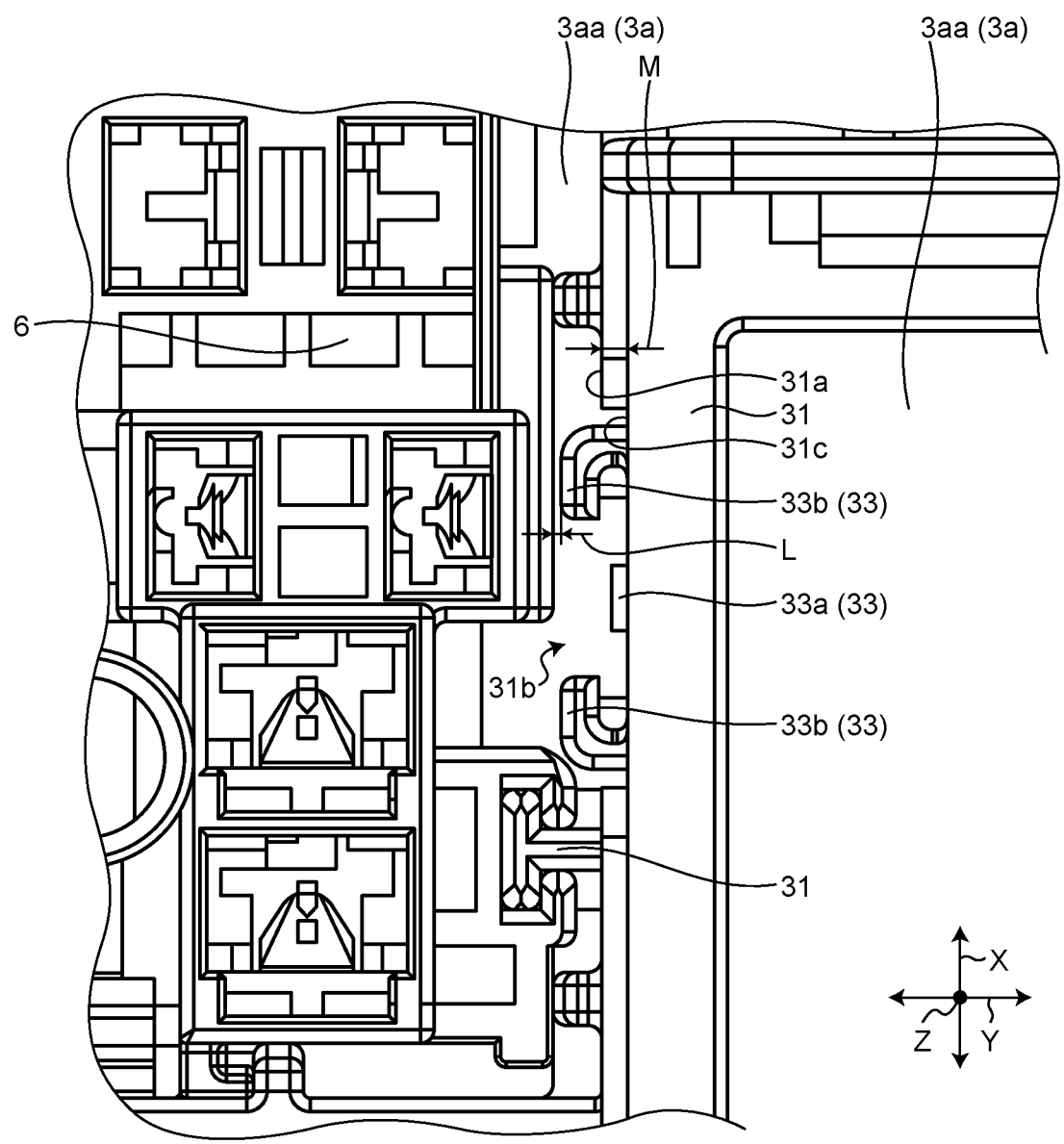
FIG. 4 is a plan view schematically illustrating the locking part of the joint connector provided on the partition wall of the electrical junction box.
Figure 5:
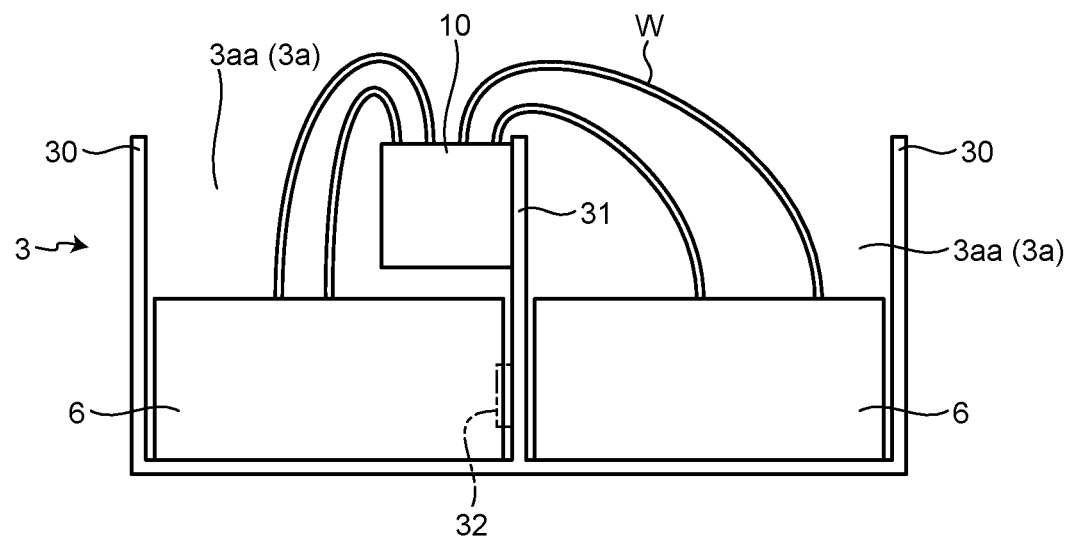
FIG. 5 is a schematic diagram illustrating a layout example of the joint connector housed in the electrical junction box.
Figure 6:
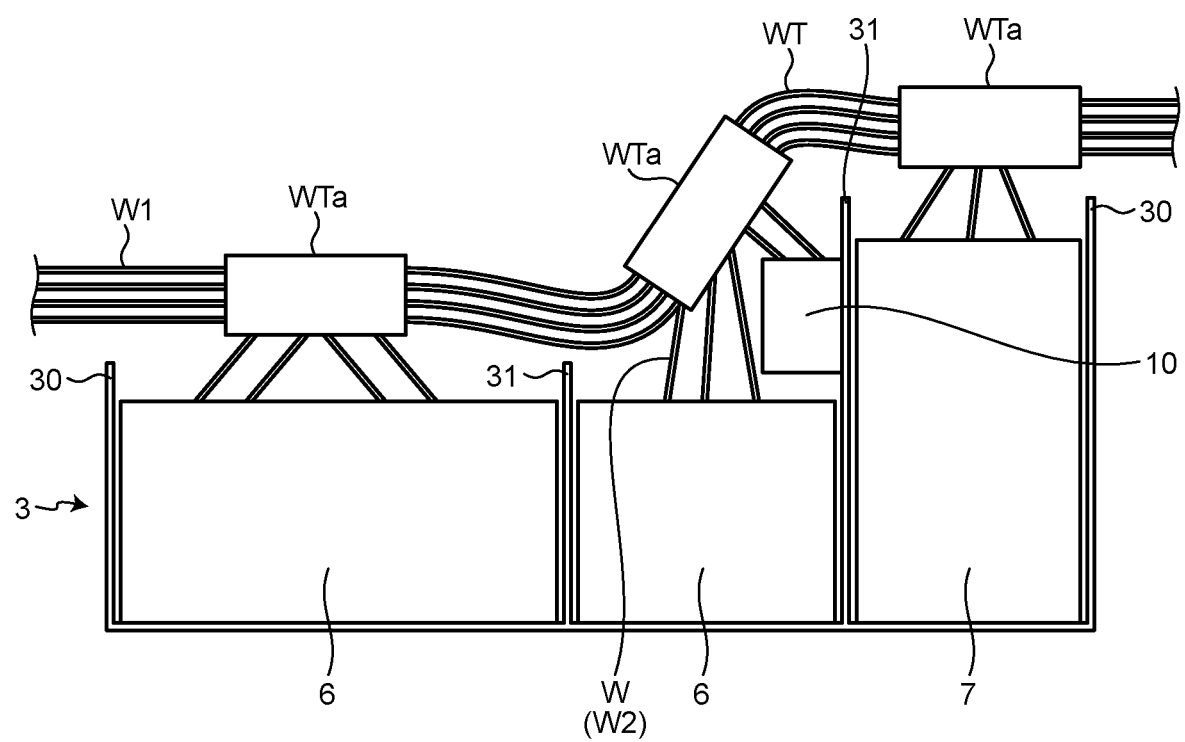
FIG. 6 is a schematic diagram illustrating another layout example of the joint connector housed in the electrical junction box.

A wire harness WH and an electrical junction box 1 according to the embodiment will be described. FIG. 1 is an exploded perspective view schematically illustrating an overview of a configuration of the wire harness according to the embodiment. FIG. 2 is a sectional view schematically illustrating a locking structure of a joint connector inside the electrical junction box of FIG. 1. FIG. 3 is a perspective view schematically illustrating a locking part of the joint connector provided on a partition wall of the electrical junction box. FIG. 4 is a plan view schematically illustrating the locking part of the joint connector provided on the partition wall of the electrical junction box. FIG. 5 is a schematic diagram illustrating a layout example of the joint connector housed in the electrical junction box. FIG. 6 is a schematic diagram illustrating another layout example of the joint connector housed in the electrical junction box. In FIG. 2, branch lines W2 and sub-harnesses W3 assembled to joint connectors 10 and 20 are omitted.

In the following description, an X direction in the drawings is, for convenience, a first width direction of the electrical junction box according to the present embodiment. A Y direction in the drawings is, for convenience, a second width direction of the electrical junction box according to the present embodiment, which is orthogonal to the first width direction. A Z direction in the drawings is, for convenience, a height direction of the electrical junction box according to the present embodiment, which is orthogonal to the first width direction and the second width direction. In particular, as for the Z direction, a Z1 direction is defined as a first height direction, and a Z2 direction is defined as a second height direction. Furthermore, each of the above directions is denoted as "first width direction X", "second width direction Y", "height direction Z", "first height direction Z1", and "second height direction Z2".

Note here that, for making it easier to describe each part, the electrical junction box 1 is illustrated upside down in FIG. 1 to FIG. 6. When the electrical junction box 1 is actually loaded on a vehicle, the first height direction Z1 side where an upper cover 4 is provided is the upper side in a vertical direction, and the second height direction Z2 side where a lower cover 5 is provided is the lower side in the vertical direction. Furthermore, the first width direction X corresponds to a short side direction of a casing to be described later, and the second width direction Y corresponds to a long side direction of the casing. Unless otherwise noted, each of the directions used in the following description is described as the direction in a state where the parts of the electrical junction box are assembled with each other and the electrical junction box is mounted on a vehicle.

The wire harness WH according to the present embodiment is, for example, an assembly component of a plurality of wires W bundled together used for power supply and signal communication to interconnect respective devices mounted on a vehicle, being configured to connect the wires W to the devices with connectors or the like (not illustrated). As illustrated in FIG. 1, the wire harness WH includes a wire bundle WT that includes a trunk line W1 and the branch lines W2 branched from the trunk line W1, and the electrical junction box 1 that is connected to the wire bundle WT. As for the wire harness WH, the wire W is also electrically connected to the electrical junction box 1 via a connection terminal P (see FIG. 2) that is provided at the terminal. Note that the wire harness WH may further include a grommet, a protector, a fixture, and the like, which are not illustrated.

The trunk line W1 is configured with the wires W bundled together. The wire W includes, for example, a conductor part (core wire) exhibiting conductivity and an insulating sheath part that covers the outer side of the conductor part. The core wire may be a twisted wire of a plurality of metal strands or may be a single metal wire.

The branch line W2 has the connection terminal P provided at the terminal of each wire W. The connection terminal P is a metal fitting provided at the terminal of the wire W, and it is formed by a conductive metal material. The connection terminal P is what is called a female terminal, which is inserted and held, for example, in the joint connector 20, an electronic component block 6, and the like to be described later.

The joint connector 20 electrically connects the wires W to each other by being fitted to the joint connector 10 to be described later. As illustrated in FIG. 2, the joint connector 20 is molded into a rectangular casing shape using an insulating synthetic resin material or the like, and houses inside thereof the connection terminals P provided at the terminals of the wires W that configure the branch lines W2. The joint connector 20 is what is called a female connector, and fits to the joint connector 10 that is a male connector.

As illustrated in FIG. 2, the joint connector 10 is molded into a rectangular casing shape using an insulating synthetic resin material or the like, and houses inside thereof connection terminals Q provided at the terminals of the wires W that configure sub-harnesses W3. The connection terminal Q is a metal fitting provided at the terminal of the wire W, and it is formed by a conductive metal material. The connection terminal Q is what is called a male terminal, which corresponds to the connection terminal P.

The joint connector 10 includes a locked part 10a that is locked to a locking part 33 to be described later provided in the electrical junction box 1. The locked part 10a is provided on a sidewall in the direction orthogonal to the locking direction (first height direction Z1) of the joint connector 10 with respect to the locking part 33 of the electrical junction box 1. The locked part 10a has a shape and a structure common to a plurality of types of joint connectors 10. The joint connector 10 is fixed to the electrical junction box 1 when the locked part 10a is locked to the locking part 33.

The sub-harness W3 is, for example, configured with the wires W, the connection terminal P provided at one end of each of the wires W, the connection terminal Q provided at the other end of each of the wires W, and the joint connector 10. As for the sub-harness W3, the connection terminal Q provided at the other end of the wire W is housed in the joint connector 10, and the connection terminal P provided at the one end of the wire W is housed in the electronic component block 6, for example. For example, the sub-harnesses W3 are designed to improve the assembly workability of respective parts when the sub-harnesses W3 and the electronic component blocks 6 that configure the electrical junction box 1 are assembled with each other so that the sub-harnesses W3 and the electronic component blocks 6 have a one-to-one relationship.

The electrical junction box 1 is loaded on a vehicle such as an automobile (not illustrated) to distribute power supplied from a power source such as a battery to various types of electronic devices loaded on the vehicle via various types of electronic components 100. As illustrated in FIG. 1, the electrical junction box 1 is assembled onto the wire harness WH and integrally houses, inside thereof, a connector configuring a connection processing component of the wires W or the like that are the routing materials, and the electronic component 100 such as a fuse, a relay, a branch part, and an electronic control unit. In a state where the electronic component 100 is being mounted on the electrical junction box 1, a terminal 101 protruding from the main body of the electronic component 100 is electrically connected to the connection terminal P. In other words, the electronic component 100 is electrically connected to the wire W via the terminal 101 and the connection terminal P.

The electrical junction box 1 is installed in a place exposed to the external environment such as in an engine compartment of the vehicle, for example, and it is connected between the power source such as a battery and various types of electronic devices loaded inside the vehicle. While the electrical junction box 1 may also be called a junction box, a fuse box, a relay box, or the like, those are collectively referred to as an electrical junction box in the present embodiment. As illustrated in FIG. 1, the electrical junction box 1 includes a casing 2 configured with a plurality of casing members. The electrical junction box 1 according to the present embodiment is installed in the vehicle by bringing a vehicle mounting part provided on the outside of the casing 2 into contact with a mounting panel or the like (not illustrated) on the vehicle side and fastening the vehicle mounting part with the mounting panel on the vehicle side with fastening members such as bolts.

As illustrated in FIG. 1, the casing 2 is formed in a box shape using an insulating synthetic resin material or the like, and a housing space part 2a formed inside thereof houses the electronic component 100 and part of the wire bundle WT in the extending direction. The casing 2 includes a frame 3, the upper cover 4, and the lower cover 5, and has a structure in which a plurality of layers (three layers) are stacked in the order of the lower cover 5, the frame 3, and the upper cover 4 from the second height direction Z2 side, that is, a structure divided into a plurality of casing members.

The frame 3 is part of the casing 2. As illustrated in FIG. 1, the frame 3 is formed to have a rectangular outer peripheral shape when viewed from the height direction Z in an installed state where the electrical junction box 1 is installed in the vehicle. The frame 3 includes a housing space part 3a. The housing space part 3a is part of the housing space part 2a of the casing 2. In the installed state, the frame 3 has an opening part 3b formed at an end part on the second height direction Z2 side and an opening part 3c formed at an end part on the first height direction Z1 side. The frame 3 is formed in a hollow shape where the opening part 3b and the opening part 3c communicate in the height direction Z via the housing space part 3a. The frame 3 has the housing space part 3a divided into a plurality of sections, and the electronic component block 6 where the electronic component 100 is housed as well as the electronic component 100 are inserted and held in the sectioned housing space part 3a. The frame 3 includes a frame-side sidewall 30, a partition wall 31, and a fixing part 32.

The frame-side sidewall 30 is formed along the opening part 3b to surround the housing space part 3a. The frame-side sidewall 30 configures a double layered wall with an outer wall and an inner wall, for example. The outer wall and the inner wall are formed to sandwich the lower cover-side sidewalls configuring the lower cover 5 in a closed state where the lower cover 5 closes the opening part 3b.

The partition wall 31 sections the housing space part 3a into sections for each of the electronic component blocks 6 into which the electronic component 100 is assembled. The partition wall 31, for example, has both ends in the extending direction connected in a direction intersecting with the frame-side sidewall 30, and sections the housing space part 3a into a plurality of sectioned space parts 3aa. Each of the sectioned space parts 3aa houses the electronic component block 6. The joint connectors 10 and 20 along with the electronic component block 6 are housed in one of the sectioned space parts 3aa (see FIG. 5 and FIG. 6). The partition wall 31 includes the locking part 33.

As illustrated in FIG. 5, the fixing part 32 is for locking and fixing the electronic component block 6. The fixing part 32 is formed by protruding from the partition wall 31 toward the sectioned space part 3aa, for example. The fixing part 32 is disposed by being isolated from the locking part 33 in the height direction Z.

The locking part 33 locks the joint connector 10 housed in the sectioned space part 3aa from the opening part 3b on the lower side. The locking part 33 is formed to be capable of being locked to the locked part 10a that is common to a plurality of types of joint connectors 10. As illustrated in FIG. 5, among a plurality of the partition walls 31, the locking part 33 is formed on the partition wall 31 between the two sectioned space parts 3aa neighboring to each other in the orthogonal direction that is orthogonal to the insertion direction (first height direction Z1) of the electronic component block 6. The locking part 33 is formed from the partition wall 31 toward the sectioned space part 3aa, for example.

In a fixed state where the electronic component block 6 is fixed to the partition wall 31 by the fixing part 32, the locking part 33 is positioned on the lower side than the electronic component block 6 is, and is provided at a position where the joint connector 10 locked by the locking part 33 does not interfere with the electronic component block 6. The locking part 33 is isolated from the electronic component block 6 in the second height direction Z2 in the fixed state described above. The locking part 33 is provided on a partition wall 31a of the partition wall 31 and provided on a bottom face 31c of a recessed part 31b. In other words, the locking part 33 is formed by protruding from the bottom face 31c of the recessed part 31b of the partition wall 31 toward the sectioned space part 3aa. As illustrated in FIG. 4, the thickness of the recessed part 31b in the second width direction Y is thinner by a thickness M compared to the thickness of the partition wall 31 in the second width direction Y other than the recessed part 31b. In other words, the bottom face 31c is lower by the thickness M in the second width direction Y with respect to the partition wall 31a.

The locking part 33 is isolated from the electronic component block 6 in an orthogonal direction that is orthogonal to the insertion direction (first height direction Z1) of the electronic component block 6 when the frame 3 is viewed from the opening part 3b on the lower side. The end part of the locking part 33 on the electronic component block 6 side in the second width direction Y is isolated by a width (length) L. The locking part 33 includes a locking protrusion 33a and a pair of locking ribs 33b. The locking protrusion 33a is disposed between the pair of locking ribs 33b along the bottom face 31c of the recessed part 31b, and protrudes toward the sectioned space part 3aa. Each of the pair of locking ribs 33b is formed in an L shape, when viewed from the second height direction Z2.

The upper cover 4 is part of the casing. In the installed state, the upper cover 4 is positioned on the first height direction Z1 side of the frame 3, and closes the opening part 3c of the frame 3. The upper cover 4 is formed in a substantially rectangular shape whose outer peripheral shape is the same (including substantially the same) as that of the frame 3, when viewed from the height direction Z. The upper cover 4 includes a housing space part 4a. The housing space part 4a is part of the housing space part 2a of the casing 2. Therefore, the housing space part 2a of the casing 2 is configured with the housing space part 3a of the frame 3, the housing space part 4a of the upper cover 4, and a housing space part 5a of the lower cover 5. The upper cover 4 has an opening part 4b formed at an end part on the second height direction Z2 side. The upper cover 4 is formed in a lid shape where the housing space part 4a and the opening part 4b communicate. When being assembled to the frame 3, the upper cover 4 is locked to the frame 3 by a locking mechanism (not illustrated) provided on the side face of the upper cover 4, with the opening part 4b facing the opening part 3c of the frame 3 in the height direction Z.

The lower cover 5 is part of the casing 2. In the installed state, the lower cover 5 is positioned on the second height direction Z2 side of the frame 3, and closes the opening part 3b of the frame 3. The lower cover 5 is formed in a substantially rectangular shape whose outer peripheral shape is the same (including substantially the same) as that of the frame 3, when viewed from the height direction Z. The lower cover 5 includes the housing space part 5a. The housing space part 5a is part of the housing space part 2a of the casing 2. The lower cover 5 has an opening part 5b formed at an end part on the first height direction Z1 side. The lower cover 5 is formed in a tray shape where the housing space part 5a and the opening part 5b communicate. When being assembled to the frame 3, the lower cover 5 is locked to the frame 3, with the opening part 5b facing the opening part 3b of the frame 3 in the height direction Z.

Next, the assembly procedure of the wire harness WH according to the present embodiment will be described. First, an operator assembles the respective connection terminals P of the wires W to the electronic component blocks 6 to fabricate the branch lines W2. The operator also prepares the necessary sub-harnesses W3.

Next, the operator inserts the electronic component block 6 together with the branch line W2 from the second height direction Z2 side of the frame 3 into a prescribed sectioned space part 3aa and fixes the electronic component block 6 to the fixing part 32. Then, the operator houses the joint connector 10 of the sub-harness W3 in the prescribed sectioned space part 3aa and locks the locked part 10a to the locking part 33 on the partition wall 31 to fix the joint connector 10 to the frame 3 side. The operator then routes the sub-harness W3 within the frame 3 and fits the joint connector 20, which holds the connection terminal P provided at the terminal of the branch line W2, to the joint connector 10. Then, the operator attaches the electronic component 100 to each electronic component block 6 from the first height direction Z1 side of the frame 3, and electrically connects the electronic component 100 to the wire W.

Next, the operator places the lower cover 5 on the second height direction Z2 side of the frame 3, and inserts the lower cover 5 to the frame 3 from the second height direction Z2 side toward the first height direction Z1 side. When the operator continues to insert the lower cover 5 to the frame 3 toward the first height direction Z1 side and is no longer able to move the lower cover 5 toward the first height direction Z1 side any further, the assembly of the lower cover 5 to the frame 3 is completed.

Then, the operator places the upper cover 4 on the first height direction Z1 side of the frame 3, and inserts the upper cover 4 to the frame 3 from the first height direction Z1 side toward the second height direction Z2 side. When the operator continues to insert the upper cover 4 to the frame 3 toward the second height direction Z2 side and is no longer able to move the upper cover 4 toward the second height direction Z2 side any further, the assembly of the upper cover 4 to the frame 3 is completed, thereby completing the assembly of the electrical junction box 1.

As described above, in the wire harness WH according to the present embodiment, the frame includes the partition walls 31. The partition wall 31 includes the locking part 33 that locks the joint connector 10 housed in the sectioned space part 3aa from the opening part 3b on the lower side. When the electronic component block 6 is being fixed to the frame 3 by the fixing part 32, the locking part 33 is positioned on the lower side than the electronic component block 6 is and isolated from the electronic component block 6 in the orthogonal direction that is orthogonal to the insertion direction (first height direction Z1) of the electronic component block 6 when the frame 3 is viewed from the opening part 3b on the lower side.

With the above configuration, the wire harness WH has the joint connector 10 and the electronic component block 6 isolated in the sectioned space part 3aa in the height direction Z and in the orthogonal direction orthogonal to the height direction Z, so that it is possible to avoid interference therebetween and securely house and fix the joint connector in the electrical junction box. As described, since the fixing structure for fixing the joint connector 10 and the like is provided in the frame 3, the wire harness WH according to the present embodiment does not require additional components for fixing the joint connector 10 and the like to the frame 3 side, which can suppress increase in the cost.

Furthermore, in the wire harness WH according to the present embodiment, the locking part 33 is formed to be capable of being locked to the locked part 10a that is common to a plurality of types of joint connectors 10. This makes it possible to use not only the joint connectors dedicated to the wire harness WH according to the present embodiment but also joint connectors that are general-purpose products, thereby suppressing increase in the component cost.

Furthermore, in the wire harness WH according to the present embodiment, the locking part 33 is formed on the partition wall 31 between the two sectioned space parts 3aa neighboring to each other in the orthogonal direction orthogonal to the insertion direction, among the partition walls 31. This makes it possible for the wire harness WH according to the present embodiment to relatively shorten the length of the wire W used between the joint connector 10 and the electronic component block 6 as illustrated in FIG. 5, for example, by providing the locking part 33 not on the frame-side sidewall 30 but on the partition wall 31. Furthermore, the wire harness WH according to the present embodiment can relatively shorten the length of the wire W used from a branch position WTa provided to the wire bundle WT to the joint connector 10 and the electronic component block 6 as illustrated in FIG. 6, for example, by providing the locking part 33 not on the frame-side sidewall 30 but on the partition wall 31.

While the joint connector 10 is fixed to the frame 3 by having the locked part 10a of the joint connector 10 locked to the locking part 33 on the partition wall 31 in the present embodiment described above, the configuration is not limited thereto. For example, a locked part provided in the joint connector 20 may be locked to the locking part 33 on the partition wall 31. In that case, the joint connector 20 is fixed to the frame 3.

The wire harnesses according to the present embodiment achieves such an effect that the joint connector can be securely housed and fixed in the electrical junction box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A wire harness comprising:
a wire exhibiting conductivity; and
an electrical junction box connected to the wire, wherein the electrical junction box includes:
    a frame including a housing space part that houses an electronic component inside, the frame being formed in a tubular shape with opening parts positioned on an upper side and on a lower side when installed;
    an upper cover that closes the opening part of the frame on the upper side; and
    a lower cover that closes the opening part of the frame on the lower side, the frame includes:
- at least one partition wall that sections the housing space part for each electronic component block into which the electronic component is assembled; and
- a fixing part that fixes the electronic component block housed from the opening part on the lower side to each sectioned space part sectioned by the partition wall, the partition wall includes a locking part that locks a joint connector that is housed in the sectioned space part from the opening part on the lower side, the joint connector electrically connecting a plurality of the wires, and the locking part is
- positioned on the lower side than the electronic component block is when the electronic component block is being fixed to the frame by the fixing part, and
- isolated from the electronic component block in an orthogonal direction that is orthogonal to an insertion direction of the electronic component block when the frame is viewed from the opening part on the lower side.

2. The wire harness according to claim 1, wherein
the locking part is formed to be capable of being locked to a locked part that is common to a plurality of types of the joint connectors.

3. The wire harness according to claim 1, wherein the locking part is formed, among a plurality of the partition walls, in the partition wall between two of the sectioned space parts neighboring to each other in the orthogonal direction.

4. The wire harness according to claim 2, wherein
the locking part is formed, among a plurality of the partition walls, in the partition wall between two of the sectioned space parts neighboring to each other in the orthogonal direction.

* * * * *